United States Patent
Bolotin

(10) Patent No.: US 6,381,516 B1
(45) Date of Patent: Apr. 30, 2002

(54) MODULAR OFF-LINE MICRO DEVICE PROCESSING SYSTEM

(75) Inventor: Lev M. Bolotin, Kirkland, WA (US)

(73) Assignee: Data I/O Corporation, Redmond, WA (US)

(*) Notice: Subject to any disclaimer, the term of this patent is extended or adjusted under 35 U.S.C. 154(b) by 0 days.

(21) Appl. No.: 09/883,662

(22) Filed: Jun. 16, 2001

(51) Int. Cl.[7] .............................................. G06F 19/00
(52) U.S. Cl. .................. 700/245; 414/416.04; 414/763; 250/559.19; 250/459.1; 209/565; 209/668; 198/345.2; 198/367
(58) Field of Search ................ 700/245, 248, 700/249; 414/416.04, 736; 29/721; 250/559.19, 459.1; 209/565, 668; 198/345.2, 367

(56) References Cited

U.S. PATENT DOCUMENTS

| | | | | |
|---|---|---|---|---|
| 3,770,123 A | * | 11/1973 | Mraz | 209/668 |
| 3,910,416 A | * | 10/1975 | Payne | 209/565 |
| 4,747,479 A | * | 5/1988 | Herrman | 198/345.2 |
| 4,820,113 A | * | 4/1989 | Farquhar | 414/736 |
| 4,891,529 A | * | 1/1990 | Braun et al. | 250/559.19 |
| 5,246,328 A | * | 9/1993 | Schuppert et al. | 414/416.04 |
| 5,323,528 A | * | 6/1994 | Baker | 29/721 |
| 5,695,071 A | * | 12/1997 | Ross et al. | 198/367 |
| 5,763,761 A | * | 6/1998 | Parente et al. | 473/453 |
| 6,071,478 A | * | 6/2000 | Modlin et al. | 250/459.1 |
| 6,111,211 A | * | 8/2000 | Dziedzic et al. | 200/61.2 |
| 6,189,682 B1 | * | 2/2001 | Hill | 144/2.1 |

OTHER PUBLICATIONS

BP–6500 In–Line Programming System brochure, BP Microsystems, Inc 1999, 2 pages.*
BP–6500 In–Line Programming System Data Sheet, BP Microsystems, Inc 1999, 1 page.*
"BP–6500 In–Line Programming & Fifth Generation Techonology", BP Microsystems, Inc 1999, 7 pages.*
Lazzari, IC's manufacturing trends, 1988, IEEE, pp. 101–103.*

* cited by examiner

Primary Examiner—William A. Cuchlinski, Jr.
Assistant Examiner—McDieunel Marc
(74) Attorney, Agent, or Firm—Mikio Ishimaru

(57) ABSTRACT

An off-line micro device processing system is provided having a longitudinally extending feeder/processing/buffer system for providing processed micro devices to a pick point. A portable robotic system has a longitudinally extending robotic system body extending parallel to the longitudinally extending feeder/processing/buffer system and a transverse support on the robotic system body transversely positioned relative to the longitudinally extending robotic system body. A pick and place mechanism on the transverse support picks micro devices from the input, transversely moves the micro devices, and places the micro devices on the output system for receiving and storing processed micro devices.

25 Claims, 2 Drawing Sheets

MODULAR OFF-LINE MICRO DEVICE PROCESSING SYSTEM

CROSS-REFERENCE TO RELATED APPLICATION(S)

The present application contains subject matter related to a concurrently pending U.S. Patent Application by Lev M. Bolotin entitled "MANUFACTURING SYSTEM WITH FEEDER/PROGRAMMING/BUFFER SYSTEM". The related application is assigned to Data I/O Corporation, is identified by Ser. No. 09/418,732, and is hereby incorporated by reference.

TECHNICAL FIELD

The present invention relates generally to a manufacturing system for electronic products, and more particularly to production of programmable integrated circuits.

BACKGROUND ART

In the past, in the programming of programmable devices such as electrically erasable programmable read-only memories (EEPROMs) and Flash EEPROMs, programming equipment was relatively large and bulky. This was because of the need to accurately insert and remove programmable devices at high speeds into and out of programming sockets in the programming unit. Since insertion and removal required relatively long traverses at high speed and very precise positioning, very rigid robotic handling equipment was required. This rigidity requirement meant that the various components had to be massive with strong structural support members to maintain structural integrity and precision positioning of the pick and place system moving at high speeds. Such programming equipment was referred to as "off-line" equipment since it was independent of the main product manufacturing "line."

The major problems associated with the previous systems have been the size and attendant costs. None of the previous off-line systems could be considered remotely portable. A simple, inexpensive off-line programming system has long been sought but equally as long has eluded those skilled in the art.

DISCLOSURE OF THE INVENTION

The present invention provides an off-line micro device processing system including a longitudinally extending feeder/processing/buffer system for providing processed micro devices to a pick point and an output system for receiving and storing processed micro devices. A portable robotic system has a longitudinally extending robotic system body extending parallel and adjacent to the longitudinally extending feeder/processing/buffer system. A transverse support on the robotic system body is transversely positioned relative to the longitudinally extending robotic system body. A pick and place mechanism moves on the transverse support for picking processed micro devices from the pick point, transversely moving the micro devices, and placing the micro devices on the output system. This provides a simple, inexpensive off-line programming system.

The present invention further provides a portable robotic system for an off-line micro device processing system. The portable robotic system has a longitudinally extending robotic system body extending parallel and adjacent to the longitudinally extending feeder/processing/buffer system. A transverse support on the robotic system body is transversely positioned relative to the longitudinally extending robotic system body. A pick and place mechanism moves on the transverse support for picking processed micro devices from the pick point, transversely moving the micro devices, and placing the micro devices on the output system. This provides a simple, inexpensive robotic system for an off-line programming system.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
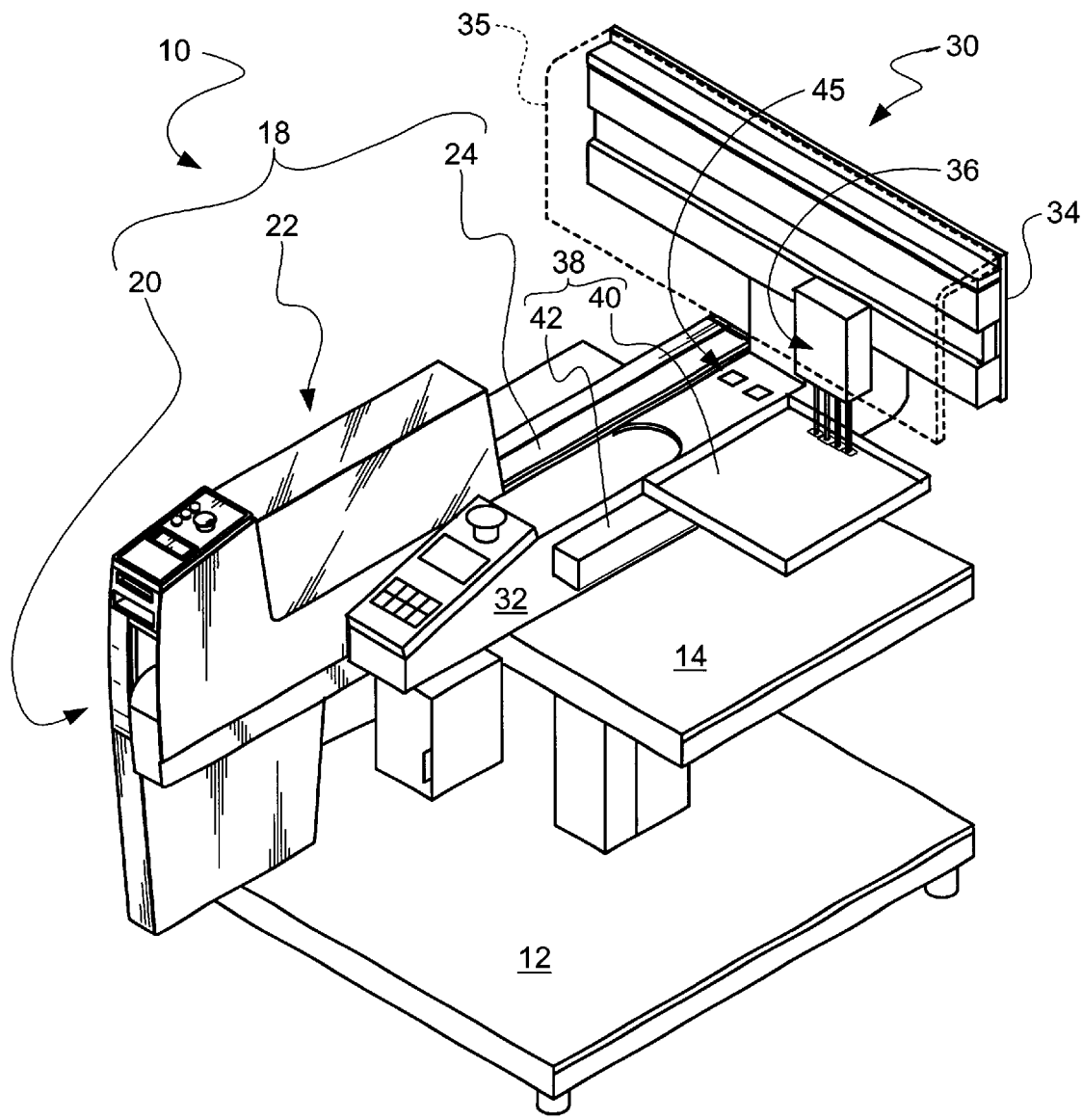
FIG. 1 is an isometric view of the off-line micro device processing system of the present invention.

Referring now to FIG. 1, therein is shown an isometric view of an off-line micro device processing system 10 of the present invention. The off-line micro device processing system 10 is shown on a standard feeder cart or table 12 having a typical top plate 14.

An input system, such as a feeder/programming/buffer system 18 is shown removably mounted to the top plate 14. The feeder/programming/buffer system 18 is fully described in the related U.S. patent application Ser. No. 09/418,732 described above and incorporated by reference. Basically, the feeder/programming/buffer system 18 consists of a feeder section 20, a programming section 22, and a buffer section 24 all of which are in-line and extend in a longitudinal direction.

A portable robotic system 30 also extends in a longitudinal direction and is adjacent and parallel to the feeder/programming/buffer system 18 and is also removably mounted on the top plate 14. The portable robotic system 30 includes a robotic system body 32 having a transverse support 34, which is perpendicular to the longitudinal direction. The transverse support 34 carries a cover 35, shown in dotted lines, and the mechanisms for a transversely moveable pick and place mechanism 36.

The pick and place mechanism 36 is inexpensive and reliable because it may be similar to the robotics handling system disclosed as being in the programming section 22 of the feeder/programming/buffer system 18.

The portable robotic system 30 also has an output system 38. The output system 38 can be a tray, tray stacker, tube, tube stacker, or tape and reel, which can accept programmed micro devices from the feeder/programming/buffer system 18. It can be integral with the portable robotic system 30 or separate, for example by using a separate tape loader or a feeder/programming/buffer system running in reverse.

In the embodiment herein, the output system 38 is shown as a tray 40 and a tray mover 42 for moving the tray 40 perpendicular to the transverse support 34.

Also in the embodiment herein, a programming system 45 is shown in the portable robotic system 30. With the feeder/programming/buffer system 18, the throughput of the off-line micro device processing system 10 can be increased. In the event that a feeder/programming/buffer system 18 is not used and a simple input system, such as a tray, is used, the portable robotic system 30 can be used for programming micro devices alone.

Figure 2:
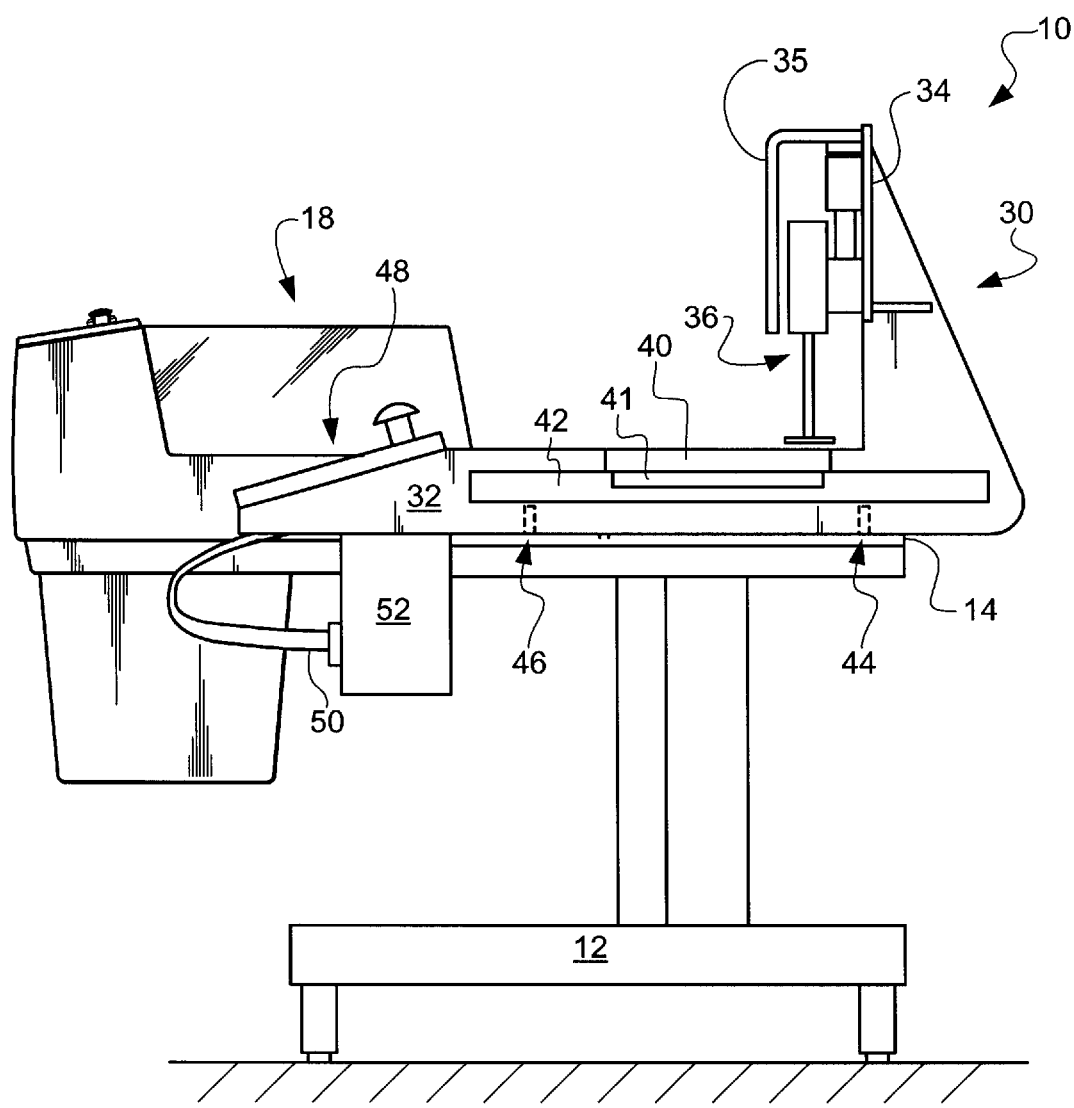
FIG. 2 is a side view of the off-line micro device processing system of the present invention.

Referring now to FIG. 2, therein is shown a side view of the off-line micro device processing system 10. The feeder/ programming/buffer system 18 is shown adjacent to the portable robotic system 30. The top plate 14 contains an alignment mechanism such as front and rear alignment units 44 and 46 for holding the robotic system body 32 in place. Also shown is a tray support 41 connected to the tray mover 42 which will allow the tray to move back and forth for micro devices to be placed upon it. The portable robotic system 30 further has a control unit 48, powered through a cable 50 from a power supply 52, to control the portable robotic system 30. The control unit 48 is distal from the transverse support 34 so it will be immediately adjacent to the control unit of the feeder/programming/buffer system 18.

In operation, unprogrammed micro devices are provided to the feeder section 20 and programmed in the programming section 22. The micro devices are then provided on the buffer section 24, which is a conveyor belt in the embodiment herein.

As the micro device reaches the pickup point, or pick point, on the buffer section 24, the pick and place mechanism 36 traverses across the traverse support 34 and picks up the micro device. Depending upon the number of pickup heads (four shown in FIG. 1) of the pick and place mechanism 36, a certain number of the micro devices will be sequentially picked up.

The pick and place mechanism 36 traverses over to the output system 38 to deposit the micro devices into a tray, tape, or tube. In the present embodiment, as the process is repeated, the tray 40 is advanced by the mover 42 to prevent the micro devices from being placed on top of each other.

The portable robotic system 30 will operate until the output system 38 is filled.

It will be noted that the front and rear alignment units 44 and 46 are the same as the front and rear alignment units that are used for aligning the feeder/programming/buffer system 18 so the portable robotic system 30 will be parallel to the feeder/programming/buffer system 18 by the alignment units.

It should be noted, while the present invention uses a conventional feeder table 12, other embodiments are possible. For example, the portable robotic system 30 can be placed on a table and an input system similar to the output system could be placed on the opposite side from the output system 34 and a programming section could be inserted in the robotic system body 32 such that the pick and place mechanism 36 will pick up micro devices from the input system, provide them to the programming section in the robotic system body 32, and then remove them to put them in the output system 38. Also, a plurality of feeder/programming/buffer systems could be put side-by-side to provide greater throughput as long as the systems fit under the transverse support 34 so that the pick and place mechanism 36 can reach the micro devices.

The feeder/programming/buffer system 18, the portable robotic system 30, and the output system 38 each weigh less than fifty (50) pounds apiece so are easily carried and so are considered portable.

From the above it will be understood that the present invention is applicable to what can be described as "micro devices". Micro devices include a broad range of electronic and mechanical devices. The best mode describes processing which is programming for programmable devices, which include but are not limited to devices such as Flash memories (Flash), electrically erasable programmable read only memories ($E^2$PROM), programmable logic devices (PLDs), field programmable gate arrays (FPGAs), and microcontrollers. However, the present invention encompasses processing for all electronic, mechanical, hybrid, and other devices which require testing, measurement of device characteristics, calibration, and other processing operations. For example, these types of micro devices would include but not be limited to devices such as microprocessors, integrated circuits (ICs), application specific integrated circuits (ASICs), micro mechanical machines, micro-electro-mechanical (MEMs) devices, micro modules, and fluidic systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A portable robotic system for use with an input system for providing micro devices, comprising:

a longitudinally extending robotic system body;

a transverse support on the robotic system body transversely positioned relative to the longitudinally extending robotic system body; and a pick and place mechanism on the transverse support for picking up micro devices, transversely moving the micro devices, and placing the micro devices.

2. The portable robotic system as claimed in claim 1 wherein:

the longitudinally extending portion of the robotic body system includes a processing system for processing micro devices; and the pick and place mechanism moves transversely and picks up unprocessed micro devices, places unprocessed micro devices in the processing system, picks up processed micro devices from the processing system, and places processed micro devices from the processing system.

3. The portable robotic system as claimed in claim 1 wherein:

the output system is selected from a group consisting of a tray, a tray stacker, a tube, a tube stacker, and a tape and reel.

4. The portable robotic system as claimed in claim 1 including:

an output system for receiving micro devices, the output system includes a movable portion movable parallel to the longitudinally extending robotic body and perpendicular to the traverse support.

5. The portable robotic system as claimed in claim 1 wherein:

the input system includes a feeder/processing/buffer system.

6. The portable robotic system as claimed in claim 1 wherein:

the longitudinally extending robotic body includes a control system distal from the transverse support for controlling the pick and place mechanism.

7. The portable robotic system as claimed in claim 1 wherein:

the longitudinally extending robotic system body, the transverse support, and the pick and place mechanism weights less than fifty pounds.

8. An off-line micro device processing system comprising:
- a longitudinally extending feeder/processing/buffer system for providing processed micro devices to a pick point;
- an output system for receiving and storing processed micro devices; and
- a portable robotic system including:
    - a longitudinally extending robotic system body extending parallel to the longitudinally extending feeder/processing/buffer system;
    - a transverse support on the robotic system body transversely positioned relative to the longitudinally extending robotic system body; and
    - a pick and place mechanism on the transverse support for picking processed micro devices from the pick point, transversely moving the processed micro devices, and placing the processed micro devices in the output system.

9. The off-line micro device processing system as claimed in claim 8 wherein:
- the longitudinally extending portion of the robotic body system includes a processing system for processing micro devices;
- the longitudinally extending feeder/processing/buffer system provides unprocessed micro devices to the pick point;
- the pick and place mechanism moves transversely and places unprocessed micro devices from the pick point into the processing system, and the pick and place mechanism moves transversely and picks processed micro devices from the processing system and places the processed micro devices in the output system.

10. The off-line micro device processing system as claimed in claim 8 including:
- a feeder table; and
- a top plate on the feeder table for removably mounting the longitudinally extending feeder/processing/buffer system and the portable robotic system.

11. The off-line micro device processing system as claimed in claim 8 wherein:
- the longitudinally extending feeder/processing/buffer system includes a control distal from the pick point; and
- the portable robotic system includes a control adjacent to the longitudinally extending feeder/processing/buffer system control and distal from the transverse support.

12. The off-line micro device processing as claimed in claim 8 wherein:
- the output system includes a movable portion movable parallel to the longitudinally extending robotic body system and under the pick and place mechanism for placement of the processed micro devices.

13. The off-line micro device processing system as claimed in claim 8 wherein:
- the output system is selected from a group consisting of a tray, a tray stacker, a tube, a tube stacker, and a tape and reel.

14. A portable robotic system for use with an input system for providing micro devices, comprising:
- a longitudinally extending robotic system body;
- a transverse support on the robotic system body transversely positioned relative to the longitudinally extending robotic system body;
- an output system for receiving micro devices, the output system includes a movable portion for moving parallel to the longitudinally extending robotic body; and
- a pick and place mechanism on the transverse support for picking micro devices from the input system, transversely moving the micro devices, and placing the micro devices on the movable portion of the output system.

15. The portable robotic system as claimed in claim 14 including:
- the longitudinally extending portion of the robotic body system includes a programming system for programming micro devices; and
- the pick and place mechanism moves transversely and places unprogrammed micro devices from the input system into the programming system, and the pick and place mechanism moves transversely and picks up programmed micro devices from the programming system.

16. The portable robotic system as claimed in claim 14 wherein:
- the output system is selected from a group consisting of a tray, a tray stacker, a tube, a tube stacker, and a tape and reel.

17. The portable robotic system as claimed in claim 14 wherein:
- the input system includes a feeder/processing/buffer system.

18. The portable robotic system as claimed in claim 14 wherein:
- the longitudinally extending robotic body includes a control system distal from the transverse support for controlling the pick and place mechanism.

19. The portable robotic system as claimed in claim 14 wherein:
- the longitudinally extending robotic system body, the transverse support, and the pick and place mechanism weights less than fifty pounds.

20. An off-line micro device programming system comprising:
- a longitudinally extending feeder/programming/buffer system for providing programmed micro devices to a pick point;
- an output system for receiving and storing programmed micro devices, the output system includes a movable portion for moving parallel to the longitudinally extending robotic body system; and
- a portable robotic system including:
    - a longitudinally extending robotic system body extending adjacent and parallel to the longitudinally extending feeder/programming/buffer system;
    - a transverse support on the robotic system body transversely positioned relative to the longitudinally extending robotic system body and extending over the longitudinally extending feeder/programming/buffer system and over the output system; and
    - a pick and place mechanism on the transverse support for picking programmed micro devices from the pick point, transversely moving the programmed micro devices, and placing the programmed micro devices in the movable portion of the output system.

21. The off-line micro device programming system as claimed in claim 20 wherein:
- the longitudinally extending portion of the robotic body system includes a programming system for programming micro devices;
- the longitudinally extending feeder/programming/buffer system provides unprogrammed micro devices to the pick point;

the pick and place mechanism moves transversely and places unprogrammed micro devices from the pick point into the programming system, and the pick and place mechanism moves transversely and picks programmed micro devices from the programming system and places the programmed micro devices in the output system.

22. The off-line micro device programming system as claimed in claim 20 including:

a feeder table; and a top plate on the feeder table for removably mounting the longitudinally extending feeder/programming/buffer system and the portable robotic system.

23. The off-line micro device programming system as claimed in claim 20 wherein:

the longitudinally extending feeder/programming/buffer system includes a control distal from the pick point; and the portable robotic system includes a control adjacent to a control for the longitudinally extending feeder/programming/buffer system and distal from the transverse support.

24. The off-line micro device processing as claimed in claim 20 wherein:

the output system includes a movable portion movable parallel to the longitudinally extending robotic body system and under the pick and place mechanism for placement of the programmed micro devices.

25. The portable robotic system as claimed in claim 20 wherein:

the output system is selected from a group consisting of a tray, a tray stacker, a tube, a tube stacker, and a tape and reel.

* * * * *